June 7, 1966
N. L. BROWN
3,254,536
PRESSURE TRANSDUCER
Filed July 30, 1963
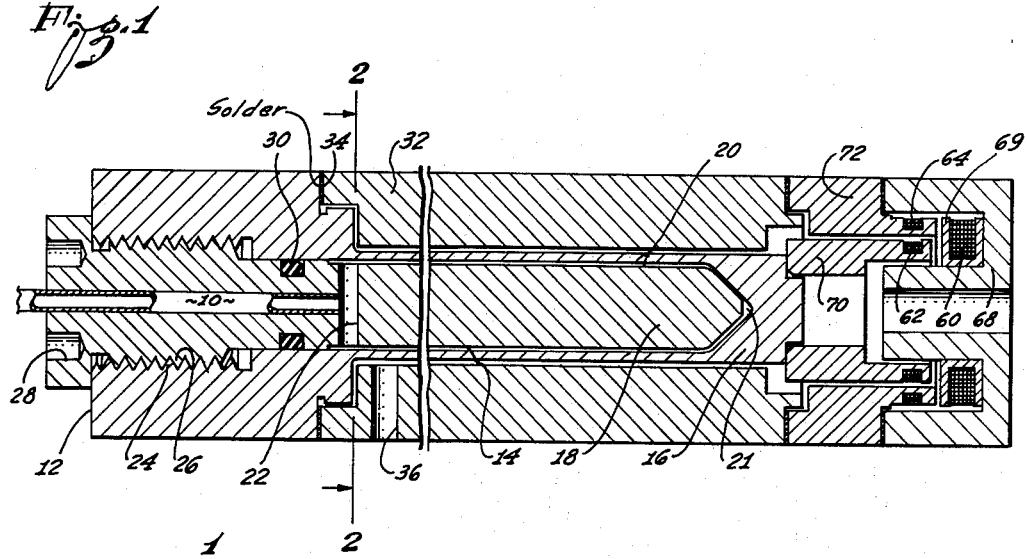
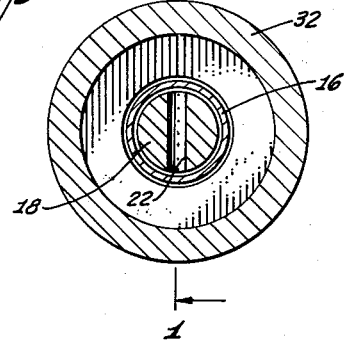
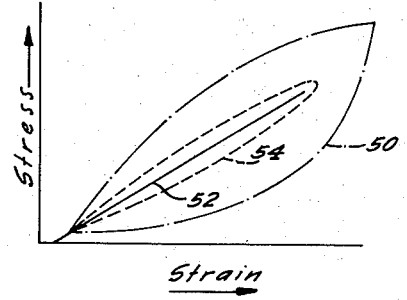
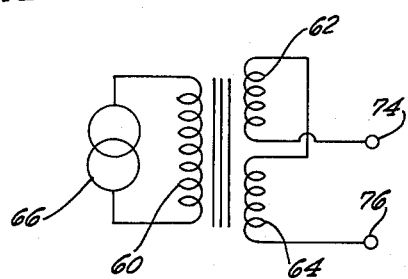
INVENTOR:
Neil L. Brown
Attorneys

United States Patent Office 3,254,536
Patented June 7, 1966

3,254,536
PRESSURE TRANSDUCER
Neil L. Brown, El Cajon, Calif., assignor to The Bissett-Berman Corporation, Santa Monica, Calif., a corporation of California
Filed July 30, 1963, Ser. No. 298,727
9 Claims. (Cl. 73—393)

This invention relates to pressure-sensing transducers and, more particularly, to transducers which respond only to pressure and not to other parameters such as temperature in producing an output measurement.

Heretofore, in the art of pressure sensing, workers have been troubled by thermal and non-linear reactions of transducers. When one is attempting to design and fabricate a transducer which is directly and solely responsive to changes in the pressure of a fluid medium, it becomes important to reduce, and hopefully, eliminate, all measurements resulting from thermal changes within and without the transducer. This is particularly important because of the fact that such transducers are often used in thermally critical environments and also because abrupt changes in pressure are characteristically attended by changes in the temperature of the pressurized fluid. Considerable effort has been made over an extended number of years to provide a transducer which will respond only to changes in the pressure of a fluid and not to other parameters such as changes in temperature resulting from changes in fluid pressure. Such attempts have previously not been entirely successful.

This invention provides a pressure transducer which overcomes the disadvantages described in the previous paragraph. For example, the pressure transducer includes a sensing member and a reference member which are expansible in substantially only a single direction. The sensing member is expansible in the single direction in response to changes in the pressure of a fluid introduced into the member and is also expansible in response to changes in ambient temperature. The sensing member is disposed within the reference member, which is expansible in response only to changes in ambient temperature. This causes the differential expansion of the sensing member relative to the reference member to provide a direct indication of the changes in fluid pressure.

The sensing and reference members are made from a suitable material such as beryllium copper. This material is advantageous since its low modulus of elasticity and low Poissons ratio endow it with a higher axial expansion than other materials of similar strength at the same degree of stress. Furthermore, the changes in the longitudinal direction with changes in fluid pressure are relatively great. By forming the sensing and reference members from the same material such as beryllium copper, the members have the same response to extraneous parameters such as changes in temperature.

The invention also includes means for insuring that both the sensing and reference members will respond equally and quickly to changes in the temperature. Such means include a plug which is disposed within the sensing member to limit the amount of fluid which can enter into the sensing member. By limiting the amount of this fluid, the amount of heat generated by changes in the fluid pressure is minimized. Furthermore, the plug is able to dissipate any heat generated from changes in fluid pressure, especially when the plug is made from a thermally conductive material.

In the drawings:

FIGURE 1 is a sectional view of one embodiment of the invention and is taken substantially on the line 1—1 of FIGURE 2;

FIGURE 2 is a sectional view substantially on the line 2—2 of FIGURE 1;

FIGURE 3 provides curves illustrating certain response characteristics of a sensing member in the pressure transducer when a particular material is used as the sensing member; and FIGURE 4 is a simplified diagram of an electrical circuit for providing an output indication of the fluid pressure.

In one embodiment of the invention, the fluid to be sensed for pressure is introduced into a port 10 adjacent the rear end 12 of the pressure transducer. The fluid then becomes disposed within an internal cavity 14 in a sensing member 16. The sensing member 16 may be provided with an annular configuration and may be made from a suitable material such as beryllium copper. Disposed centrally within the cavity 14 in the sensing member 16 is a plug 18 which is provided at its forward end with dimensions slightly less than those of the cavity 14 so as to define a narrow annular gap 20. The gap 20 may terminate in a slightly enlarged reservoir area 21 at the forward end of the sensing member 16. The gap 20 receives fluid from the port 10 by providing a hole 22 in a radial direction in the plug.

As will be described in detail below, the plug 18, although not necessary for practicing the invention, offers a convenient means for keeping the volume of the test fluid in the cavity 14 as small as possible so as to minimize the amount of heat generated in the cavity by changes in the pressure of the fluid. As a result, the plug 18 is preferably made from a thermally conductive material. The plug 18 shou'd be fabricated so as to mechanically withstand the fluid pressures developed in the gap without being compressively strained or distorted by such fluid pressures.

It will be appreciated by those skilled in the art that, by minimizing the volume of test fluid in the cavity 14 and thereby minimizing the amount of heat able to be generated in the cavity, the plug 18 offers a means of minimizing the overall temperature sensitivity of the pressure transducer, thereby making the transducer sensitive substantially only to pressure. Other means noted below will be provided according to the invention so as to further minimize this temperature sensitivity. Minimizing such temperature sensitivity is obviously signficant to those skilled in the art, especially since it is a common problem attendant with pressurizing fluids.

The plug 18 is adapted to be retained in fixed position relative to the sensing member 16 by providing the plug with external threads 24 at its rear end and by screwing the plug into an internally threaded portion 26 at the rear end of the sensing member . This may be accomplished by disposing a wrench (not shown) within sockets 28 in the plug. An O-ring 30 is disposed between the plug 18 and the sensing member 16 at an intermediate position along the length of the plug and at a rearward position relative to the hole 22 so as to seal the plug and the sensing member and to prevent fluid from leaking from the cavity 14.

Encompassing sensing member 16 at the forward end is a reference member 32 which is preferably formed from the same material as the sensing member 16, such as beryllium copper. The reference member 32 is attached at a rear wall 34 to the sensing member 16 as by soft solder such as silver solder. The reference member 32 is provided with a radial hole 36 which communicates with the space between the sensing member 16 and the reference member 32 at an intermediate position along the axial lengths of the members. In this way, the space between the reference member 32 and the sensing member 16 is maintained at atmospheric pressure.

As will be apparent to those skilled in the art, the reference member 32 and the sensing member 16 are adapted to move in the axial direction. The sensing member 16 expands in the axial direction with increases in the pressure of the fluid introduced to the port 10 and with increases in the ambient temperature. The reference member 32 expands in the axial direction only with increases in the ambient temperature. Since the members 16 and 32 are made from the same material, they expand equally with increases in the ambient temperature. This causes the axial dimensions of the sensing member 16 to change relative to the axial dimensions of the reference member 32 only in response to variations in the pressure of the fluid introduced to the part 10.

It will be appreciated that temperature variations are produced as the pressure of the fluid changes since the fluid produces heat as its pressure increases. These temperature variations do not materially affect the operation of the pressure transducer for certain important reasons. One reason is that only a relatively small amount of fluid is introduced into the cavity 14 in view of the operation of the plug 18 in defining the small gap 20. Since only a small amount of fluid is introduced into the cavity 14, the fluid can generate only a relatively small amount of heat as its pressure varies. Another reason is that the plug is made from thermally conductive material. This causes the plug to conduct any heat resulting from differences in temperature between the sensing member 16 and the reference member 32.

By using a suitable material such as beryllium copper, the sensing member 16 experiences relatively great changes in dimension in the axial direction with relatively small changes in fluid pressure. The relatively great changes in dimension in the axial direction of the sensing member 16 may be expressed mathematically by the following approximation:

$$\Delta l = \frac{l \cdot s}{E}(1 - 2\rho)$$

where:

$l$ = effective length in the axial direction of the sensing member 16;
$\Delta l$ = change in the effective length of the sensing member 16;
$s$ = axial stress of the sensing member 16;
$E$ = the elastic modulus of the sensing member 16; and
$\rho$ = the Poisson's ratio of the sensing member 16.

As will be seen from the previous paragraph, the change in the effective length of the sensing member increases if the Poisson's ratio of the material forming the sensing member is relatively low. The Poisson's ratio may be expressed as the ratio of the transverse strain $\Delta w/w$ to the axial strain $\Delta l/l$ resulting from the application of an axial stress. This may be expressed as $$\rho = \frac{\frac{\Delta w}{w}}{\frac{\Delta l}{l}}$$

Beryllium copper has a relatively low Poisson's ratio and low modulus of elasticity, thereby causing its axial dimension to vary considerably in comparison to other materials of similar strength at the same degree of stress.

Materials such as beryllium copper are also desirable since they have high mechanical strength, thereby achieving a higher axial expansion within the elastic limit of the material.

Beryllium copper type materials are also desirable in that they have low "mechanical-hysteresis" as illustrated in FIGURE 3. As indicated by the STRESS-STRAIN curves in FIGURE 3, mechanical hysteresis is defined as the difference between the ascending and descending branches of the STRESS-STRAIN curves. Specifically, the curves in FIGURE 3 illustrate the response of a material when the material is loaded progressively in one direction and then relieved of the load progressively in a "load cycle." With a conventional material in a pressure transducer, a relatively wide hysteresis curve, such as that illustrated at 50 in FIGURE 3, is produced wherein the elasticity is somewhat imperfect, making the loading path somewhat removed from the unloading path. A perfectly elastic material would have a straight line hysteresis curve 52 which follows the same path for both loading and unloading. Thus it is apparent that beryllium copper type materials, which have a relatively flat hysteresis curve such as that illustrated at 54, are relatively elastic and thus more desirable as a sensing material for pressure transducers.

As discussed above, the output means may comprise any suitable indicator of longitudinal excursions. For example, the inductive means shown in FIGURE 1 may be used. Such inductive means comprise a plurality of transformer coils 60, 62 and 64, the winding 60 serving as a primary winding and receiving signals from an alternating source 66 in FIGURE 4. The winding 60 is mounted on a stationary member 69 which is made from a ceramic material. The winding 60 and the ceramic stationary member 69 are attached securely to a stationary member 68 which is provided with magnetic properties and which may be made from a suitable magnetic material such as a ferrite designated as "Ferroxcube 3E" by the Ferroxcube Corporation of America with offices at Saugerties, New York.

The windings 62 and 64 are connected in an opposing relationship to serve as secondaries and to provide an output indicaiton of any difference in the voltages induced in the coils by the flux produced by the coil 60. The winding 62 is mounted on a member 70 which may be made from a suitable ceramic material such as a magnesium silicate designated as "Alsimag 222." The member 68 is attached to the forward end of the sensing member 16 by a suitable material such as an epoxy resin designated as "Araldite" so as to move in the axial direction with changes in the axial dimension of the sensing member. Similarly, the winding 64 is mounted on a member 72 which is made from the same ceramic material as the member 68 and which is attached to the forward end of the reference member 32.

The windings 62 and 64 are ordinarily positioned in a symmetrical relationship to the stationary primary winding 60 so that equal voltages are induced in the windings 62 and 64 and no output signal is produced between output terminals 74 and 76. When the sensing member 16 becomes displaced in the axial direction, however, the voltage induced in the winding 62 is no longer the same as the voltage induced in the winding 64 and an output signal is produced between the terminals 74 and 76. The amplitude of this signal provides an indication as to the magnitude of the axial displacement of the sensing member 16, and the phase of the signal provides an indication of the direction of the axial displacement.

It will be appreciated that the embodiment described above provides an indication of the fluid pressure by relative expansions of the sensing member 16 and the reference member 32 in the axial direction. It will also be appreciated that sensing and reference members may be constructed to expand in a different direction such as in a radial direction and to provide an output indication of the fluid pressure by a differential expansion of the sensing member relative to the reference member in the radial direction. It will also be appreciated that various types of systems may be used to provide output indications of the differential expansion between the sensing and reference members. For example, when the sensing and reference members expand radially, the radial distance between these members varies. This radial distance may be measured by considering the sensing and reference members as the two plates of an electrical capacitor and by determining the change in the capacitive value of these two plates.

Although this application has been disclosed and illustrated with reference to particular applications, the principles involved are susceptible of numerous other applications which will be apparent to persons skilled in the art. The invention is, therefore, to be limited only as indicated by the scope of the appended claims.

What is claimed is:

1. A pressure transducer for measuring the pressure of a fluid independently of other parameters such as ambient temperature, including:

sensing means constructed to expand in a particular direction and constructed to define a cavity, means operatively coupled to the sensing means for introducing the fluid into the cavity to obtain an expansion of the sensing means in the particular direction in accordance with the pressure of the fluid and in accordance with the ambient temperature, reference means disposed symmetrically relative to the sensing means and constructed to expand in the particular direction in accordance with the ambient temperature, the reference means having properties to expand in the paritcular direction at substantially the same rate as the sensing means in response to the ambient temperature, and output means operatively coupled to the sensing means and to the reference means to produce an output signal having characteristics representing any differences in the expansions of the sensing means and the reference means in the particular direction.

2. The pressure transducer recited in claim 1, wherein said sensing means includes:

a first hollow cylindrical member elongated in an axial direction corresponding to the particular direction and expansible in the axial direction and defining an axial cavity which extends along the member in the axial direction and which terminates adjacent a particular axial end of the member and wherein the reference member includes a second hollow cylindrical member elongated in the axial direction and disposed in a concentric relationship to the first hollow cylindrical member.

3. The pressure transducer recited in claim 1, wherein plug means are provided within said cavity to substantially fill said cavity and to define a gap between the outer periphery of said plug and the periphery of said cavity for reducing the volume and hence the heat content of the fluid disposed within said cavity and wherein the plug means are formed from a thermally conductive material to conduct any heat produced by changes in the pressure of the fluid in the cavity.

4. A pressure transducer for measuring the pressure of a fluid independently of other parameters such as ambient temperature, including:

sensing means having a particular length and having a rear end and a forward end defining the particular length, there being a cavity in the sensing means, the cavity extending along the length of the sensing means and terminating at a position adjacent the forward end of the sensing means, means operatively coupled to the cavity in the sensing means for introducing the fluid into the cavity, the sensing means being made from a particular material to obtain expansion of the sensing means in the direction of the particular length in accordance with changes in the pressure of the fluid, reference means enveloping said sensing means and made from the particular material to provide an expansion of the reference means substantially only in the direction of the particular length, and indicating means operatively coupled to the sensing means and the reference means to indicate the expansion of the sensing means relative to the reference means in the direction of the particular length.

5. The pressure transducer set forth in claim 4 wherein the particular material is beryllium copper.

6. The pressure transducer set forth in claim 4 wherein a plug is disposed in the cavity to substantially fill the cavity and minimize the amount of fluid in the cavity and wherein the plug is made from a thermally conductive material to minimize any temperature differences between the reference means and the sensing means.

7. A pressure transducer for measuring the pressure of a fluid independently of other parameters such as ambient temperature, including:

annular sensing means extending in an axial direction, said sensing means being formed from a particular material having a relatively low Poisson's ratio, said sensing means being defined by a rear portion and a forward portion, there being an annular cavity in the axial direction in the sensing means, plug means disposed in the cavity of the sensing means and substantially filling said cavity in concentric relationship with the cavity to define an annular gap, means operatively coupled to the cavity for introducing the fluid into the cavity, annular reference means enveloping said sensing means in substantially concentric relationship with the sensing means, the reference means having forward and rear portions, the rear portion of said reference means being fixedly positioned on the rear portion of the sensing means and the forward portion of the reference means being radially separated from the forward portion of the sensing means, the reference means being formed from the particular material, and output means operatively coupled to the sensing means and the reference means in the axial direction to provide an output signal having characteristics indicative of any relative displacement between the forward portions of the sensing and reference means in the axial directions.

8. The pressure transducer set forth in claim 7 wherein the plug is made of a thermally conductive material.

9. The pressure transducer set forth in claim 8 wherein the particular material is beryllium copper.

References Cited by the Examiner

UNITED STATES PATENTS 2,037,949   10/1932   Tate _____ 73—393

LOUIS R. PRINCE, *Primary Examiner.*